UNITED STATES PATENT OFFICE.

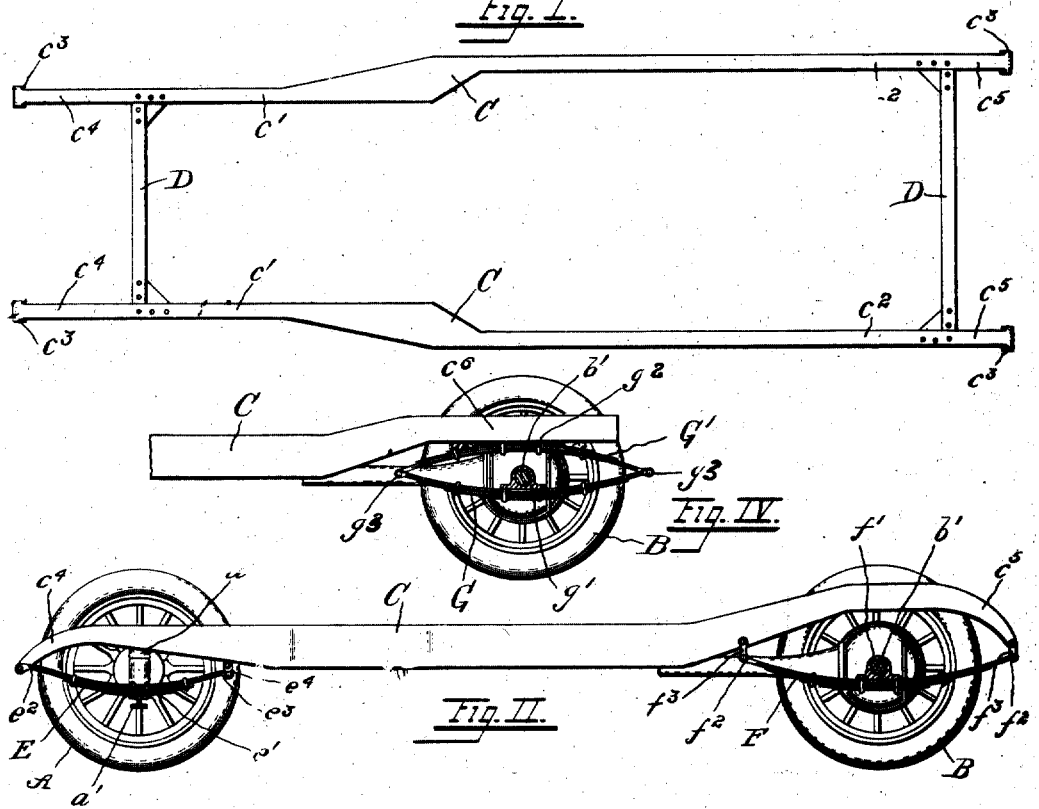
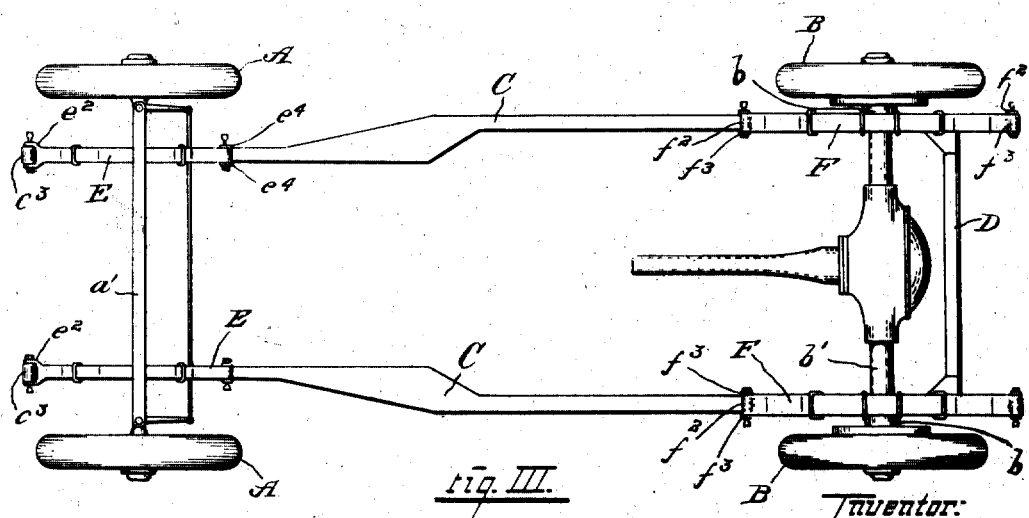

FRANÇOIS RICHARD, OF CLEVELAND, OHIO.

VEHICLE SPRING SUSPENSION.

1,251,104. Specification of Letters Patent. Patented Dec. 25, 1917.

Application filed May 23, 1914. Serial No. 840,601.

*To all whom it may concern:*

Be it known that I, François Richard, a citizen of the French Republic, residing at Cleveland, in the county of Cuyahoga and State of Ohio, have invented a new and useful Improvement in Vehicle Spring Suspensions, of which the following is a specification, the principle of the invention being herein explained and the best mode in which I have contemplated applying that principle, so as to distinguish it from other inventions.

This invention entitled a vehicle-spring suspension has particular reference to the disposition of the springs relative to the frame and especially the mounting of the springs of modern automobile construction.

According to present practice automobiles carry from three to five or more springs as the connecting medium between the axles and the body of the car. Usually, four are considered essential for touring cars of a ton and a half or more in weight and I have elected to incorporate four in the exemplification which my drawing presents. The ordinary arrangement places one spring inwardly adjacent each of the four wheels, and usually the front pair is alined directly underneath opposite sides of the frame respectively. Frequently the front end of the frame is narrower to afford steering clearance for the front wheels and it is to assist in supplying such clearance that the front springs are mounted within the outside breadth of the frame. So far as my knowledge extends, the two rear springs have never been mounted each directly beneath one of the side beams in combination with front springs similarly-mounted. I believe I have effected a new and useful result in a new way in adopting this seemingly simple expedient of placing all of the four springs not only in line with but directly underneath the front and rear ends of the two side beams of the chassis.

The object of my invention is to derive a very marked advantage which such new and useful result assures. This advantage consists in the reduction to a minimum if not the avoidance of such forces as tend to or actually do twist the frame when a flexing or reaction of a spring occurs laterally of the longitudinal beam which it supports. The constant exertion of such deleterious forces eventually loosens rivets or other securing parts to cause breakages. I insure a direct upward lift. A further object similar in theory has been to place the rear springs, which are subject to inordinate load, as closely as feasible to the rear wheels whereby the leverage between the points of inception of road shock and the connection between the spring and frame is kept as short as possible. A final object has been simplicity in altered design and incidental economy of manufacture.

The inventive conception is associated with means which are hereinafter explained and variously combined in the claims. While the annexed drawing and particular description thereof, set forth in detail the preferred form embodying my invention, it should be understood that the means only exemplify some of many diversified mechanical forms with which the principle of my invention may be justly applied.

Adverting to the drawings:

Figure I is a top plan of a vehicle frame adapted to my invention.

Fig. II is an inside elevation of one side of an automobile chassis embodying my complete invention.

Fig. III is a bottom plan of the complete chassis embodying my invention as suggested by Fig. II.

Fig. IV is a detailed elevation of a modification of my invention.

I have designated the front wheels of the vehicle with the reference letter A, the hind wheels each with the reference letter B and their hubs as "$b$," the forward axle as $a'$ and the rear axle as $b'$. The frame which I prefer to mount upon the axles through the medium of my spring connection is best seen in Figs. I and II. It will be seen that the frame comprises two longitudinally extending beams C having their fore parts $c'$ more closely spaced than the hind parts $c^2$. The four extremities of the beams C are each formed with bearing bosses $c^3$. The forward ends are arched underneath to form hangers $c^4$, while the rear ends are similarly arched over-all to form hangers $c^5$. Connecting the forward and rear ends respectively of the beams are a pair of brace members D.

I am aware that the forward ends of the beams used in automobile construction have been arched underneath to form hangers and springs which were disposed directly underneath. This much of my construction I have already impliedly disclaimed. Accordingly it will be seen that a pair of forward semi-elliptic springs E are mounted at $e'$ upon the axle $a'$ and connected in front to the bosses $c^3$ by means of clevises $e^2$ and bound by means of scrolls $e^3$ and links $e^4$ in a manner well known to the art. As is most clearly seen in Fig. III the springs E are directly underneath the forward ends $c'$ of the beams.

In the rear a pair of semi-elliptic springs F are suspended from the axle $b'$ through the medium of axle inclosing supports $f'$. The extremities of the springs F are similarly provided with scrolls $f^2$, each pair of which is movably connected to opposite ends of the hangers $c^5$ through the agency of links $f^3$. Directing attention again to Fig. III, it is to be particularly noted that the somewhat heavier springs F are likewise directly underneath the rear ends $c^2$ of the frame.

It is necessary in automobile construction to allow a certain clearance owing to the requirement for steering or the turning of the forward wheels and it is for this reason that the forward ends of the frame are set in relatively to the wheels. In the rear of the vehicle this is, however, unnecessary and it has been a considerable mistake on the part of other designers to space the rear wheels any farther from the springs and incidentally from the frame than was absolutely necessary. My invention is especially designed to bring both ends $c^2$ and the springs F as closely as feasible to the rear wheels B thereby avoiding excessive leverage tending to warp the frame, to strain the springs with a torsional action and eventually to loosen or fracture the connections therebetween.

The two features of my invention therefore directly coöperate to the end of lengthening the life of the vehicle spring suspension means by a reaction on the part of the springs between the planes which opposite sides thereof normally occupy.

When it is desired to resort to the use of full elliptic springs upon the rear axle, the purpose of the upwardly recessed or curved rearward ends of the frame becomes more apparent. Such rear ends need not, however, be of equal length since springs of this type are connected thereto in the same vertical plane of the axle. It will accordingly be seen from an inspection of the modification shown in Fig. IV, that the rear ends $c^6$ of the frame are shortened and are connected to the axle $b'$ by a pair of full elliptic springs whose two component parts G and G' are connected respectively to the axle by means of a support $g'$ and to the frame at $g^2$. Corresponding scrolls at the extremities of the parts G and G' are pivotally connected in any suitable manner by pins $g^3$. Otherwise, the special function of my two featured inventive conception is similarly conserved.

My invention being thus described with sufficient thoroughness, what I desire to secure by Letters Patent and therefore claim specifically, is:

1. A vehicle-spring suspension comprising a pair of axles, wheels upon opposite ends of each axle, the front wheels being spaced apart the same distance as the hind wheels, and a frame having beams extending between said axles, said beams having their under surfaces recessed upwardly at opposite ends and being spaced apart a greater distance at the rear axle than at the front axle, the arrangement being such that rear portions of said beams are immediately adjacent to said wheels, a pair of springs extending transversely of said axles and connecting corresponding ends of said beams with the forward of said axles at considerable distances from the inner sides of the front wheels, opposite ends of said springs being movably attached to the under side of said beams such that the springs and beams are disposed in the same vertical planes respectively, and a second pair of springs attached to the rear of said axles and located immediately adjacent the inner sides of the rear wheel respectively, said springs similarly extending directly underneath and having their ends movably attached to said beams, whereby doubly to insure against torsional strains upon the frame incident to a flexure of the springs.

2. A vehicle-spring suspension comprising an axle, wheels upon opposite ends of such axle, a frame having beams extending above and across such axle as closely as possible to the inner sides of the wheels, and a pair of springs operatively connecting said frame and axle and likewise located as closely as possible to the inner sides of said wheels respectively and in consequence directly underneath opposite sides of said frame, whereby to minimize torsional strains upon all the parts incident to a flexure of the springs.

Signed by me, this 7th day of May, 1914.

FRANÇOIS RICHARD.

Attested by—
  MARY COLEMAN,
  F. M. BRADY.